(12) United States Patent
Jin et al.

(10) Patent No.: US 9,731,276 B2
(45) Date of Patent: Aug. 15, 2017

(54) COMPOSITE, CATALYST INCLUDING THE SAME, FUEL CELL AND LITHIUM AIR BATTERY INCLUDING THE SAME

(71) Applicant: SAMSUNG SDI CO., LTD., Yongin-si, Gyeonggi-do (KR)

(72) Inventors: Seon-ah Jin, Pocheon-si (KR); Chan-ho Pak, Seoul (KR); Dae-jong Yoo, Seoul (KR); Kang-hee Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 826 days.

(21) Appl. No.: 13/674,369

(22) Filed: Nov. 12, 2012

(65) Prior Publication Data
US 2013/0196237 A1    Aug. 1, 2013

(30) Foreign Application Priority Data

Jan. 27, 2012 (KR) .................. 10-2012-0008531

(51) Int. Cl.
| | |
|---|---|
| *B01J 23/656* | (2006.01) |
| *H01M 4/90* | (2006.01) |
| *H01M 4/92* | (2006.01) |
| *B01J 23/10* | (2006.01) |
| *B01J 23/34* | (2006.01) |
| *B01J 23/63* | (2006.01) |
| *H01M 4/86* | (2006.01) |
| *H01M 12/06* | (2006.01) |
| *H01M 12/08* | (2006.01) |
| *H01M 8/1007* | (2016.01) |

(52) U.S. Cl.
CPC .......... *B01J 23/6562* (2013.01); *B01J 23/10* (2013.01); *B01J 23/34* (2013.01); *B01J 23/63* (2013.01); *H01M 4/8647* (2013.01); *H01M 4/9016* (2013.01); *H01M 4/921* (2013.01); *H01M 4/926* (2013.01); *H01M 12/06* (2013.01); *H01M 8/1007* (2016.02); *H01M 12/08* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 6,492,298 B1 | 12/2002 | Sobukawa et al. | |
| 7,067,453 B1 | 6/2006 | Ming et al. | |
| 7,842,200 B2 | 11/2010 | Ehrman et al. | |
| 7,871,957 B2 | 1/2011 | Willigan et al. | |
| 2009/0130518 A1* | 5/2009 | Lee ................ | H01M 4/885 429/532 |

(Continued)

FOREIGN PATENT DOCUMENTS

| | | |
|---|---|---|
| CN | 101623637 A | 1/2010 |
| JP | 2001-187343 A | 7/2001 |

(Continued)

OTHER PUBLICATIONS

Liu et al, High surface area of CeCuO and CeMnO solid solutions for CO and HCHO oxidation (2009).*

(Continued)

*Primary Examiner* — Sarah A Slifka
(74) *Attorney, Agent, or Firm* — Lewis Roca Rothgerber Christie LLP

(57) ABSTRACT

A composite including: a carbonaceous material; and a solid solution including a first metal and a cerium oxide, wherein the solid solution is disposed on the carbonaceous material.

19 Claims, 11 Drawing Sheets

(56) References Cited

U.S. PATENT DOCUMENTS

| | | | | |
|---|---|---|---|---|
| 2010/0151296 A1* | 6/2010 | Lee | ......................... | H01M 4/86 |
| | | | | 429/525 |
| 2012/0183869 A1* | 7/2012 | Jin | ...................... | H01M 4/8657 |
| | | | | 429/405 |

FOREIGN PATENT DOCUMENTS

| | | |
|---|---|---|
| JP | 2003-100308 A | 4/2003 |
| JP | 2008-112724 A | 5/2008 |
| KR | 100561169 B1 | 3/2006 |
| WO | 2009120439 A1 | 10/2009 |
| WO | WO 2010/131536 A1 | 11/2010 |

OTHER PUBLICATIONS

The extended European Search Report for European Patent Application No. 13163961.9 dated Aug. 2, 2013.

Luo et al., "Characterization of PdO/Ce0.8Y0.2O1.9 catalysts for carbon monoxide and methane oxidation", Journal of Molecular Catalysis A: Chemical 260, 2006, pp. 125-156.

Guo et al., "Development of PtRu-CeO2/C anode electrocatalyst for direct methanol fuel cells", Journal of Power Sources, 156, 2006, pp. 345-354.

SIPO Office action dated Jan. 5, 2016, with English translation, for corresponding Chinese Patent application 201310022370.0, (16 pages).

Liu et al., "High Surface Area $Ce_{0.9}Cu_{0.1}O_{2-\delta}$ and $Ce_{0.9}Mn_{0.1}O_{2-\delta}$ Solid Solutions for CO and HCHO Oxidation," Indian Journal of Chemistry, vol. 48A, Oct. 2009, pp. 1352-1357.

SIPO Office Action dated Jul. 18, 2016, with English Translation, for corresponding Chinese Patent Application No. 201310022370.0 (19 pages).

JPO Office Action dated Jan. 4, 2017, for corresponding Japanese Patent Application No. 2013-012022 (7 pages).

SIPO Office Action, with English translation, dated Feb. 20, 2017, for corresponding Chinese Patent Application No. 201310022370.0 (6 pages).

* cited by examiner

COMPOSITE, CATALYST INCLUDING THE SAME, FUEL CELL AND LITHIUM AIR BATTERY INCLUDING THE SAME

This application claims priority to and the benefit of Korean Patent Application No. 10-2012-0008531, filed on Jan. 27, 2012, and all the benefits accruing therefrom under 35 U.S.C. §119, the content of which is incorporated herein in its entirety by reference.

BACKGROUND

1. Field

The present disclosure relates to a composite, a catalyst including the composite, a fuel cell including the catalyst, and a lithium air battery including the catalyst.

2. Description of the Related Art

Fuel cells are power generating devices that directly convert the chemical energy of a fuel and an oxidant, such as hydrogen and oxygen, into electrical energy. Fuel cells can continuously generate electricity so long as a supply of fuel and an oxidant, such as hydrogen and oxygen, is provided, unlike a battery. Also, because fuel cells generate electricity directly, unlike other power generating devices, fuel cells can provided improved efficiency loss by avoiding multiple steps in the power generating process. The direct energy conversion provided by fuel cells may lead to efficiency twice as high as that of an internal combustion engine.

According to a type of an electrolyte and fuel used, fuel cells can be classified as polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs).

PEMFCs and DMFCs, which are power generating systems which electrochemically generate direct current (DC) electricity from hydrogen or methanol and oxygen, each include a membrane-electrode assembly (MEA). The MEA includes an anode to which a reaction liquid or gas is supplied, a cathode, and a proton conducting membrane disposed between the anode and the cathode.

In the anode protons are generated by oxidization of hydrogen or methanol by a catalyst. These protons pass through the proton conducting membrane and reach the cathode where the protons react with oxygen in the presence of a catalyst, thereby generating electricity. Thus, in fuel cells having such a structure as described above, the performance of the catalyst can determine the performance of the fuel cell.

A PEMFC MEA includes an amorphous carbon support with dispersed Pt particles on both in the anode and the cathode. A DMFC uses PtRu in the anode, and Pt in the cathode, which are used either in particulate form or dispersed on an amorphous carbon support.

Catalysts are a key contributing factor to the entire manufacturing cost of fuel cells, and may have a significant effect on mass production and commercialization of fuel cells. Therefore, there remains a need for improved catalysts that provide improved activity.

SUMMARY

Provided is a composite having an improved oxygen donating activity, a catalyst including the composite, a fuel cell including the catalyst, and a lithium air battery including the catalyst.

Additional aspects will be set forth in part in the description which follows and, in part, will be apparent from the description.

According to an aspect, a composite includes a carbonaceous material; and a solid solution including a first metal and a cerium oxide, wherein the solid solution is disposed on the carbonaceous material.

According to another aspect, disclosed is a catalyst including the composite and a second metal.

According to another aspect, a fuel cell includes a cathode; an anode; and an electrolyte membrane disposed between the cathode and the anode, wherein at least one of the cathode and the anode includes a catalyst including the composite.

According to another aspect, a lithium air battery includes an electrode including the composite.

According to yet another aspect, disclosed is a method of manufacturing the composite, the method including: combining a first metal and a cerium oxide to form a solid solution; and disposing the solid solution on the carbonaceous material to manufacture the composite.

Also disclosed is a method of manufacturing the catalyst disclosed above, the method including: providing a first metal-cerium oxide solid solution; contacting a second metal or a precursor of the second metal with the first metal-cerium oxide solid solution; and heating the solid solution and the second metal to form the catalyst.

BRIEF DESCRIPTION OF THE DRAWINGS

These and/or other aspects will become apparent and more readily appreciated from the following description of the embodiments, taken in conjunction with the accompanying drawings in which:

FIGS. 4A through 4C are results of a scanning transmission electron microscopy and energy-dispersive X-ray spectrometry (STEM-EDX) analysis of the catalyst of Example 1 in which FIGS. 4B and 2C are graphs of intensity (counts) versus energy (electron volts, eV);

DETAILED DESCRIPTION

Figure 1:
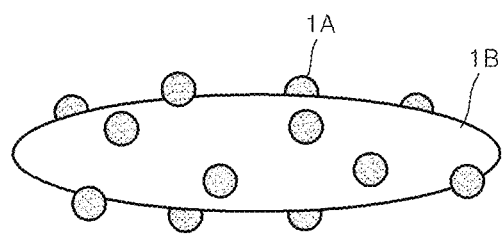
FIG. 1 is a schematic diagram illustrating an embodiment of a catalyst including an active particle supported on a carbonaceous material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Disclosed is a composite including a solid solution of a first metal and a cerium oxide. The first metal may be a solute in the cerium oxide. The composite further comprises a carbonaceous material, and the solid solution is disposed on the carbonaceous material.

In an embodiment, the solid solution has a structure in which the first metal is a solute in the cerium oxide, and is dissolved in the cerium oxide. Herein, the term "dissolved" represents a state in which the first metal is intermixed and uniformly distributed in the cerium oxide structure to form a solid solution. The cerium oxide structure may be crystalline, polycrystalline, or amorphous, or a combination thereof.

The first metal may be present substitutionally or interstitially. In the first metal-cerium oxide solid solution, the first metal may be inserted in a unit lattice of the cerium oxide structure.

For example, the first metal-cerium oxide solid solution may be a substitutional solid solution in which some cerium sites of the cerium oxide crystal structure are substituted with the first metal. Also, the first metal may be disposed in an interstitial space of the cerium oxide structure to provide an interstitial solid solution.

In the composite, the carbonaceous material is a carbon containing conductive material. The carbonaceous material may comprise any type of carbon that suitably supports the solid solution to provide a catalyst having suitable activity. The carbonaceous material may comprise an amorphous carbon, a crystalline or graphitic carbon, or a vitreous or glassy carbon. Also, the carbonaceous material may be in any suitable form, and may be in the form of a powder, fiber, or flake, and may have any suitable crystallographic orientation, crystallite size, interlayer spacing, density, particle size, or particle shape. The carbonaceous material may comprise a carbon selected from Ketjen Black, carbon black, lamp black, acetylene black, mesocarbon, graphite, pyrolytic graphite, single-wall carbon nanotubes, multi-wall carbon nanotubes, Vulcan carbon, and carbon fiber. The carbonaceous material may have a particle size (e.g., an average largest diameter) of about 0.01 μm to about 10 μm.

In the composite, an amount of the carbonaceous material may be about 10 to about 95 parts by weight, based on 100 parts by weight of the composite, for example about 30 to about 80 parts by weight, specifically about 40 to about 70 parts by weight, based on 100 parts by weight of the composite. When the concentration of the carbonaceous material is within the foregoing range, an oxygen donating activity of the composite is increased.

In the composite, a particle diameter (e.g., an average largest diameter) of the first metal-cerium oxide solid solution is about 1 nanometer (nm) to about 20 nm, specifically about 1.5 nm to about 10 nm, more specifically about 2 nm to about 5 nm.

In the composite, the first metal includes at least one metal selected from Groups 3-8, Groups 10-14, and Group 16 of the Periodic Table of the Elements.

For the first metal, at least one selected from manganese (Mn), vanadium (V), copper (Cu), zinc (Zn), iron (Fe), cobalt (Co), and titanium (Ti) may be used.

A composite in which manganese (Mn) is the first metal is specifically mentioned.

The composite may provide improved oxygen donating activity and may be, for example, provided as further described below.

While not wanting to be bound by theory, it is understood that the first metal of the solid solution, e.g., manganese in the cerium oxide, serves to release active oxygen (O*) on a surface of the first metal-cerium oxide solid solution as shown in Reaction Scheme 1 below. Also, as shown in Reaction Scheme 2, the cerium(IV) oxide (e.g., $CeO_2$) reacts with a first metal oxide (e.g., $Mn_2O_3$) of Reaction Scheme 1 and produces a cerium(III) oxide (e.g., $Ce_2O_3$), and the cerium(III) oxide (e.g., $Ce_2O_3$), which has a high affinity for oxygen, is converted back to the cerium(IV) oxide (e.g., $CeO_2$).

The cerium of the cerium oxide is understood to promote dissociation of the oxygen molecules from the cerium oxide and to provide oxygen anions ($O^{2-}$) to the first metal-cerium oxide solid solution.

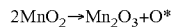

$2MnO_2 \rightarrow Mn_2O_3 + O^*$  Reaction Scheme 1

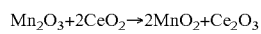

$Mn_2O_3 + 2CeO_2 \rightarrow 2MnO_2 + Ce_2O_3$  Reaction Scheme 2

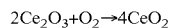

$2Ce_2O_3 + O_2 \rightarrow 4CeO_2$  Reaction Scheme 3

Thus, oxygen mobility of the oxygen on the surface of the first metal-cerium oxide solid solution is improved, and an oxygen storage capacity of the cerium oxide, which has the high affinity for oxygen, is much improved. Therefore, the disclosed composite is useful as a support which provides improved oxygen donating activity.

The composite, which comprises a carbonaceous material, may be used as an electrochemical catalyst alone or in combination with a second metal, which is further described below. In the catalyst, when the composite is used as the support having high oxygen donating activity, an oxygen reduction reaction (ORR) activity of a cathode, is increased. The increased ORR activity can be used to provide a fuel cell having improved performance.

The composite may be used as a catalyst promoter to assist an active particle, and can act as a catalyst support.

In the composite and the catalyst, an amount of the first metal may be about 0.1 mole to about 1.5 moles, for example, from about 0.1 moles to about 1 mole, more specifically about 0.2 mole to about 1.3 moles, based on 1 mole of cerium of the cerium oxide. When the amount of the first metal is within this range, oxygen donating activity of the composite and the catalyst is improved.

Also provided is a catalyst comprising the composite described above and the second metal.

In the catalyst, the second metal ($M^2$) may be at least one metal selected from Groups 8-11 of the Periodic Table of the Elements. The second metal may be at least one selected from platinum (Pt), palladium (Pd), ruthenium (Ru), iridium (Ir), gold (Au), and silver (Ag). The second metal may be, for example, a Pt alloy, a Pd alloy, or a Pd—Ir alloy.

In the Pd—Ir alloy, a molar ratio of Pd and Ir may be, for example, about 1:1 to about 5:1, specifically about 2:1 to about 4:1, more specifically about 2.5:1 to about 3.5:1, or the like. An embodiment in which the second metal is an alloy of Pd and Ir is specifically mentioned.

The first metal-cerium oxide solid-solution may be, for example, represented by Formula 1 and Formula 2.

$M^1O_x$—$CeO_2/C$  Formula 1

In Formula 1, $1 \leq x \leq 3$, a $M^1$ is a first metal.

$Ce_yM^1_{1-y}O_2/C$  Formula 2

In Formula 2, $0.01 \leq y \leq 0.99$, a $M^1$ is a first metal.

In Formulas 1 and 2, independently, $M^1$ is at least one metal selected from Groups 3-8, 10-14, and 16. In Formulas 1 and 2, independently, the first metal may be, for example, at least one selected from Mn, V, Cu, Zn, Fe, Co, and Ti. An embodiment in which $M^1$ is Mn is specifically mentioned.

For example, y is about 0.1 to about 0.9, for example about 0.2 to about 0.8, specifically about 0.3 to about 0.7.

The first metal-cerium oxide solid solution includes, for example, a solid solution of cerium oxide and manganese in the cerium oxide. In the solid solution, the first metal, e.g., manganese, substitutes at some cerium sites, e.g., cerium sites, in the cerium oxide crystal. Also, the first metal may be disposed in an interstitial space of the cerium oxide structure to provide an interstitial solid solution.

Also, the catalyst may further include a reduction product of the first metal-cerium oxide solid solution. An embodiment in which the catalyst comprises a reduction product of a solid solution of Mn and $CeO_2$ is specifically mentioned.

The catalyst may have a structure including an active particle 1A and a carbonaceous material 1B as shown in FIG. 1. The active particle comprises the cerium oxide solid solution. In another embodiment, the active particle comprises the cerium oxide solid solution and the second metal. The shape of the active particle can comprise a variety or regular or irregular geometrical features, and the active particle can comprise a spherical, conical, tubular, or hemispherical shape. The active particle can have a size, e.g., an average largest diameter, of about 1 nm to about 100 nm, specifically about 2 nm to about 80 nm, more specifically about 3 nm to about 20 nm.

The active particle may have any suitable structure, so long as the active particle provides desirable properties. The active particle may have a homogeneous composition. In another embodiment the active particle may include a core comprising the first metal-cerium oxide solid solution, and a shell including a reduction product of the first metal-cerium oxide and the second metal. In an embodiment the shell comprises a reduction product of the first metal-cerium oxide solid solution and an alloy comprising the second metal. In an embodiment the first metal-cerium oxide solid solution is a solution of manganese in cerium oxide, and the alloy comprising the second metal is an alloy of Pd and Ir.

In the catalyst, a core-shell structure may be confirmed by scanning transmission electron microscopy with energy-dispersive X-ray spectrometry (STEM-EDX).

A second metal layer including the second metal may be further included on top of the shell. In an embodiment, the second metal of the shell and the second metal of the second metal layer are independently selected. In another embodiment the second metal of the shell and the second metal of the second metal layer are the same.

A thickness of the second metal layer is not particularly limited, and may be, for example, about 0.1 to about 5 nm, specifically about 0.5 to about 2 nm.

The reduction product of the first metal-cerium oxide may be, for example, represented by Formula 3 or Formula 4.

$$M^1O_x\text{—}CeO_{2-z}/C \quad \text{Formula 3}$$

In Formula 3, $0 \leq x \leq 2$, $0 < 2-z$, $0 < z < 2$, $M^1$ is a first metal.

$$Ce_yM^1_{1-y}O_{2-z}/C \quad \text{Formula 4}$$

In Formula 4, $0.01 \leq y \leq 0.99$, $0 < 2-z$, $0 < z < 2$, $M^1$ is a first metal.

In Formula 3, for example, $0.1 \leq z \leq 1.9$, and in Formula 4, for example, $1 \leq z \leq 1.9$.

In Formulas 3 and 4, independently, $M^1$ is at least one metal selected from Groups 3-8, 10-14, and 16. In Formulas 3 and 4, independently, the first metal may be, for example, at least one selected from the group consisting of Mn, V, Cu, Zn, Fe, Co, and Ti. An embodiment in which $M^1$ is Mn is specifically mentioned.

While not wanting to be bound by theory, a catalyst may have improved activity by forming a strong bond between a reduction product of the first metal-cerium oxide and the second metal through a reduction reaction on a surface of the first metal-cerium oxide at a high temperature.

In the catalyst, an amount of the second metal is about 1 to about 70 parts by weight, for example about 10 to about 65 parts by weight, specifically about 20 to about 60 parts by weight, based on 100 parts by weight of a total weight of the catalyst.

In the composite, an amount of the first metal-cerium oxide solid solution is about 5 to about 90 parts by weight, specifically about 10 to about 80 parts by weight, more specifically about 15 to about 70 parts by weight, based on 100 parts by weight of the composite.

When the amount of the second metal or the first metal-cerium oxide are within the range above, the activity of the catalyst is improved.

The catalyst may have a structure including the composite and PdIr as a second metal. The composite may include a manganese-cerium oxide solid solution and a carbonaceous material. The manganese-cerium oxide solid solution may comprise a cerium oxide and manganese dissolved in the cerium oxide. The catalyst may have a structure including an active particle disposed on a carbonaceous material. The active particle may include a core including the cerium oxide and the manganese-cerium oxide solid solution in which manganese is dissolved in the cerium oxide; and a shell including the reduction product of the manganese-cerium oxide solid solution and an alloy of PdIr as a second metal.

According to an embodiment, in the catalyst may comprise an amount of an oxide of the first metal, e.g. manganese oxide ($Mn_3O_4$).

FIG. 1 is a schematic diagram illustrating an embodiment of a catalyst supported on a carbonaceous material 1B.

Referring to FIG. 1, the catalyst comprises active particles 1A supported on a carbonaceous material 1B. The active particles 1A include the composite and the second metal described above.

Although not shown in FIG. 1, the active particles 1A may have, for example, a structure including a core comprising a first metal-cerium oxide in which a first metal is dissolved in a cerium oxide, and a shell comprising a reduction product of the first metal-cerium oxide solid solution and an alloy of the second metal outside the core.

Also, although not shown in FIG. 1, a second metal layer including the second metal may be further disposed on the outer surface of the shell.

The composite may be manufactured by combining the first metal and the cerium oxide to form a solid solution, and disposing the solid solution on the carbonaceous material.

According to an embodiment, a catalyst comprising a core-shell structure may be manufactured by providing a first metal-cerium oxide solid solution, which forms a core, disposing the second metal particles or a second metal precursor on the solid solution, and treating the solid solution and the second metal or the second metal precursor in a high temperature reduction process to provide a strong metal-support interaction.

While not wanting to be bound by theory, it is understood that an activity of the catalyst is improved due to a strong bond between a reduction product of the first metal-cerium oxide and the second metal, and a cell with improved performance, for example, improved durability may be manufactured when an electrode using the catalyst is used.

In the catalyst, the first metal may be manganese, and the second metal may be a palladium iridium (Pd—Ir) alloy. The Pd—Ir alloy may be, for example, a $Pd_5Ir$ alloy or a $Pd_1Ir_1$ alloy.

The catalyst, for example, includes the composite, which includes a first metal cerium oxide solid solution in which the first metal, e.g., manganese, is dissolved in the cerium oxide, and a carbonaceous material, and a second metal. The catalyst may include a core, which includes a composite including a first metal cerium oxide in which the first metal is dissolved in a cerium oxide and a carbonaceous material, and a shell, which includes a reduction product of the first metal-cerium oxide and an alloy of the second metal.

The catalyst is useful as an electrode catalyst for a fuel cell.

A fuel cell according to an embodiment comprises a polymer electrolyte membrane and an electrode including a catalyst layer comprising the composite. In an embodiment the catalyst layer comprises containing the catalyst.

When presented with hydrogen, a hydrogen oxidation reaction (HOR) represented below occurs in an anode of the fuel cell.

$$H_2 \rightarrow 2H^+ + 2e^-$$

Hydrogen ions ($H^+$) generated through the reaction diffuse through the electrolyte.

Also, an oxygen reduction reaction (ORR) represented below occurs in a cathode.

$$2H^+ + 2e^- + \tfrac{1}{2}O_2 \rightarrow H_2O$$

In the electrode catalyst, the active particle supported on the carbonaceous material may have an average diameter (e.g., an average largest diameter) of about 1 nm to about 100 nm, specifically about 2 nm to about 80 nm, more specifically about 1 nm to about 20 nm. When the diameter of the active particle is within this range, the catalyst may have increased activity. The diameter of the active particle may be determined by X-ray diffraction (XRD) analysis.

According to an embodiment, the catalyst has improved ORR activity, and thus the catalyst is useful as a cathode catalyst.

Hereinafter, a method of preparing the catalyst according to an embodiment will be further disclosed.

First, a second metal precursor is mixed with a solvent to prepare a second metal precursor mixture.

For the second metal precursor, at least one selected from a palladium precursor, a platinum precursor, a ruthenium precursor, an iridium precursor, a silver precursor, and a gold precursor may be used.

The second metal precursor, e.g., a palladium precursor, platinum precursor, ruthenium precursor, iridium precursor, silver precursor, or gold precursor, may be at least one selected from a nitrate, chloride, sulfate, acetate, acetylacetonate, and a cyanide comprising at least one selected from platinum, ruthenium, iridium, silver, and gold.

For the solvent, at least one selected from distilled water, ethanol, methanol, and ethylene glycol, and the like may be used. Also, an amount of the solvent may be about 100 to about 5000 parts by weight, specifically about 200 to about 4000 parts by weight, based on 100 parts by weight of the second metal precursor. When the concentration of the solvent is within this range, a uniformly dispersed second metal precursor mixture may be obtained.

A first metal-cerium oxide and a composite including a carbonaceous material is added to the second metal precursor mixture to prepare a mixture.

The mixture is dried and thermally treated at about 400° C. or higher to be reduced, and thus, a catalyst may be prepared.

The thermal treatment to induce reduction may be performed at a temperature of, for example, about 400° C. to about 900° C., for example about 450° C. to about 800° C., and for example from about 500° C. to about 700° C. When the temperature of the thermal treatment for reduction is within this range, a catalyst with increased activity may be attained.

The thermal treatment to induce reduction is not specifically limited; for example, the thermal treatment to induce reduction may be performed in a furnace supplied with a reducing gas. The reducing gas may comprise, for example, hydrogen.

The composite including the first metal-cerium oxide and the carbonaceous material mentioned above may be prepared by carrying out the following process.

First, a cerium precursor, e.g. a cerium precursor, and a first metal precursor are mixed with a solvent to prepare a cerium precursor mixture.

Separately, a carbonaceous material and a solvent are mixed, and the resulting mixture is combined with the cerium precursor mixture.

Then, the cerium precursor mixture is thermally treated to oxidize the cerium precursor mixture.

Nitrates, chlorides, sulfates, acetates, acetylacetonates, or cyanides comprising the cerium may be used for the cerium precursor.

Nitrates, chlorides, sulfate, acetates, acetylacetonates, cyanides, isopropoxides, or butoxides of the first metal may be used for the first metal precursor.

When a manganese precursor is used for the first metal precursor, non-limiting examples of the manganese precursor include $KMnO_4$, $Mn(NO_3)_2$, and a combination thereof may be used. An amount of the first metal precursor may be about 0.1 moles to about 1.5 moles based on 1 mole of the cerium precursor.

For the solvent used for preparing the cerium precursor mixture, distilled water, ethanol, methanol, ethylene glycol, or the like may be used. Also, an amount of the solvent may be about 100 to about 5000 parts by weight, based on 100 parts by weight of the cerium precursor and the first metal precursor.

The thermal treatment to induce oxidation may be performed at a temperature less than 300° C., for example at about 100° C. to about 290° C. When the temperature of the thermal treatment for oxidation is within this range, the first metal-cerium oxide or the first metal-cerium oxide/carbonaceous material composite is formed of particles that are amorphous or have low crystallinity. An activity of a catalyst may be improved if the first metal-cerium oxide or the first metal-cerium oxide/carbonaceous material composite is used.

An amount of the carbonaceous material may be about 10 to about 1000 parts by weight, based on 100 parts by weight of the cerium precursor and the first metal precursor. When the concentration of the carbonaceous material is within this range, an activity of the catalyst is increased.

A process of obtaining a mixture by mixing the second metal precursor or the second metal particles with the first metal-cerium oxide solid solution may be, for example, performed by dispersing the second metal precursor or the second metal particles in the first metal-cerium oxide.

In more detail, the second metal particles are dispersed in the product obtained from the thermal treatment to induce oxidation by using a liquid-phase reduction method, or the second metal precursor may be dispersed in the product obtained by the thermal treatment to induce oxidation.

An amount of the second metal precursor or the second metal particles may be about 10 to about 500 parts by weight, based on 100 parts by weight of the composite.

The liquid-phase reduction method may use a reducing agent, for example at least one reducing agent selected from $NaBH_4$, hydrazine, citric acid, hydrogen, and ascorbic acid.

An amount of the reducing agent may be about 1 mole to about 5 moles, based on 1 mole of the second metal precursor or the second metal. When the concentration of the reducing agent is within this range, reactivity of the reduction reaction may be high.

A fuel cell according to an embodiment includes a cathode, an anode, and an electrolyte membrane disposed between the cathode and the anode, wherein at least one of the cathode and the anode comprises the composite. Also disclosed is a fuel cell which comprises the catalyst.

The catalyst may be, for example, a supported catalyst which may be used in the cathode.

The fuel cell may be implemented as, for example, a phosphoric acid fuel cell (PAFC), a polymer electrolyte membrane fuel cell (PEMFC), or a direct methanol fuel cell (DMFC).

The fuel cell may be a PEMFC, such as a PEMFC suitable for use in a vehicle.

Figure 2:
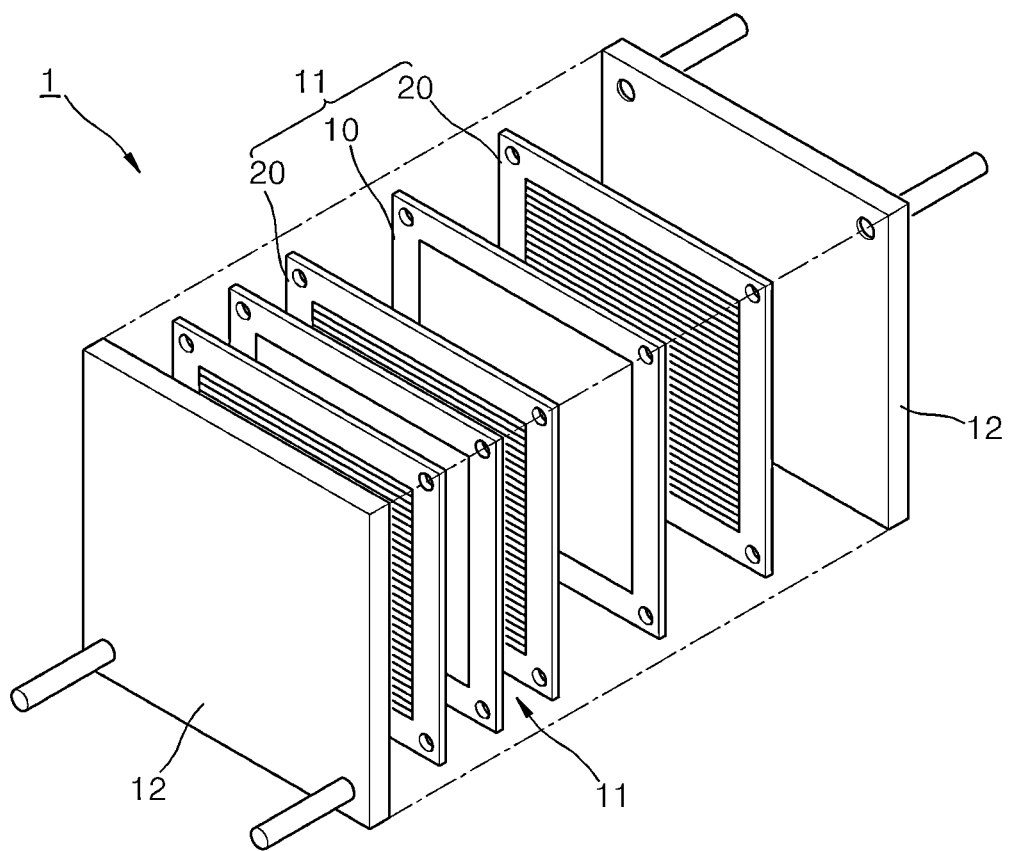
FIG. 2 is a perspective exploded view of an embodiment of a fuel cell.
Figure 3:
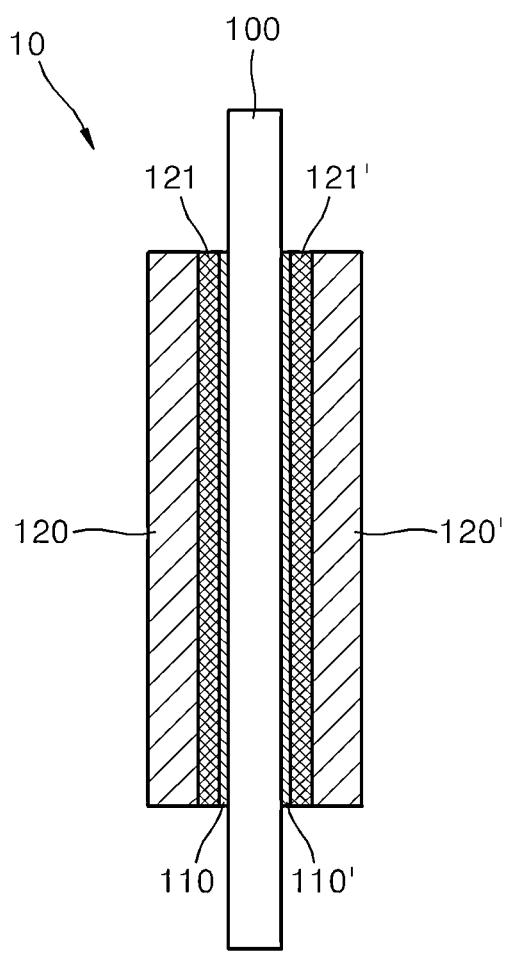
FIG. 3 is a cross-sectional diagram of an embodiment of the membrane-electrode assembly (MEA) of the fuel cell of FIG. 2.

FIG. 2 is a perspective exploded view of a fuel cell 1 according to an embodiment of the present disclosure. FIG. 3 is a cross-sectional diagram of a membrane-electrode assembly (MEA) of the fuel cell 1 of FIG. 2.

Referring to FIG. 2, the fuel cell 1 includes two unit cells 11 that are supported by a pair of pressure plates 12. Each unit cell 11 includes an MEA 10 and bipolar plates 20 disposed on opposite sides of the MEA 10. The bipolar plates 20 include a conductive metal, such as carbon or the like, and function as current collectors while providing oxygen and fuel to the catalyst layers of the MEAs 10. In an embodiment the bipolar plates 20 are non-porous. In another embodiment the bipolar plates are porous and in operation the pores comprise water.

Although only two unit cells 11 are shown in FIG. 2, the number of unit cells is not limited to two and a fuel cell may have several tens or hundreds of unit cells, depending on the desired properties of the fuel cell.

Referring to FIG. 3, each MEA 10 includes an electrolyte membrane 100, first and second catalyst layers 110 and 110', at least one of which includes a composite and/or an electrode catalyst according to the above-described embodiment, and respectively disposed on either side of the electrolyte membrane 100 in the thickness direction thereof; first and second primary gas diffusion layers 121 and 121', respectively disposed on the first and second catalyst layers 110 and 110'; and first and second secondary gas diffusion layers 120 and 120' respectively disposed on the primary gas diffusion layers 121 and 121'.

At least one of the catalyst layers 110 and 110' include a catalyst according to the above-described embodiment, and a binder. The catalyst layers 110 and 110' may further include a material able to increase the electrochemical surface area of the catalyst.

The primary gas diffusion layers 121 and 121' and the secondary gas diffusion layers 120 and 120' may each comprise a material such as, for example, a carbon sheet or carbon paper. The primary gas diffusion layers 121 and 121' and the secondary gas diffusion layers 120 and 120' diffuse oxygen and fuel supplied through the bipolar plates 20 into the entire surface of the catalyst layers 110 and 110'.

The fuel cell 1 including the MEA 10 operates at a temperature of about 0 to about 300° C., specifically about 100 to about 300° C. A fuel, such as hydrogen, is supplied through one of the bipolar plates 20 to a first catalyst layer, and an oxidant, such as oxygen, is supplied through the other bipolar plate 20 to a second catalyst layer. Then, hydrogen is oxidized into protons in the first catalyst layer, and the protons are conducted to the second catalyst layer through the electrolyte membrane 100. Then, the protons electrochemically react with oxygen in the second catalyst layer to produce water and generate electrical energy. Hydrogen produced by reforming a hydrocarbon, such as an alcohol, may be used as the fuel. Oxygen as the oxidant may be supplied in the form of air.

According to another embodiment, a lithium air battery including an electrode containing the composite described above is provided.

The electrode may further include a second metal of the catalyst described above.

The composite may be used as an electrode active material. The electrode active material is, for example, a cathode active material.

Types and concentrations of the first metal and a second metal in the electrode may be identical to those used in the catalyst described above.

Hereinafter, one or more embodiments will be described in further detail with reference to the following examples. These examples are not intended to limit the purpose and scope of the disclosed embodiment.

EXAMPLES

Preparation Example 1: Preparation of Composite 1 grams (g) of Ketjen Black as a carbonaceous material was dissolved in distilled water to prepare a carbonaceous material mixture.

0.729 g of $(NH_4)_2Ce(NO_3)_6$, 3.15 g of a 4 weight % $KMnO_4$ solution, and 0.154 g of $Mn(NO_3)_2 \cdot 6H_2O$ were dissolved in 200 g of distilled water to prepare a precursor mixture. A molar ratio of $Mn(NO_3)_2 \cdot 6H_2O$, $KMnO_4$, and $(NH_4)_2Ce(NO_3)_6$ was 2:3:5.

After mixing the carbonaceous material mixture and the precursor mixture, the pH of the mixture was adjusted to about 10 by adding a 2M potassium hydroxide solution.

The resulting mixture was aged at a temperature of 80° C., filtered, and rinsed. Then, the aged mixture was dried at a temperature of 110° C. to obtain a composite including a carbonaceous material and a manganese-cerium oxide ($Ce_yMn_{1-y}O_2$, $0.01 \leq y \leq 0.99$) including a cerium oxide and manganese dissolved in the cerium oxide.

An amount of the carbonaceous material in the composite was 73.2 parts by weight, and an amount of the cerium oxide was 17.2 parts by weight. Also, a molar ratio of cerium and manganese in the manganese-cerium oxide was 1:1.

Example 1: Preparation of Catalyst 0.437 g of palladium nitrate ($Pd(NO_3) \cdot 2H_2O$) as a Pd precursor and 0.766 g of hexachloroiridic acid hexahydrate as an Ir precursor were dissolved in distilled water to prepare a mixture. 0.5 g of the composite obtained in Preparation Example 1 as a support was added to the mixture, and the solvent was evaporated at a temperature of 60° C. under vacuum conditions.

The product of the evaporation was thermally treated at a temperature of 500° C. in a hydrogen atmosphere to provide a catalyst ($PdIr/Ce_yMn_{1-y}O_2(0.01 \leq y \leq 0.99)/C$) including the second metal (PdIr) and the composite including a manganese-cerium oxide ($Ce_yMn_{1-y}O_2$, $0.01 \leq y \leq 0.99$) and a carbonaceous material.

In the catalyst, based on 100 parts by weight of the catalyst, an amount of the second metal (PdIr) was 43 parts by weight, and an amount of the composite was 57 parts by weight. In the composite, based on 100 parts by weight of the composite, an amount of the carbonaceous material was about 84.48 parts by weight, and an amount of the manganese-cerium oxide was about 15.52 parts by weight.

Comparative Preparation Example 1: Preparation of Support 1 g of Ketjen Black as a carbonaceous material was dispersed in distilled water to prepare a carbonaceous material mixture. 1.458 g of $(NH_4)_2Ce(NO_3)_6$ as a cerium precursor was dissolved in distilled water to prepare a cerium precursor mixture.

After mixing the carbonaceous material mixture and the cerium precursor mixture, the pH of the mixture was adjusted to about 10 by adding a 2M potassium hydroxide solution.

The resulting mixture was aged at a temperature of 80° C., filtered, and rinsed. Then, the aged product was dried at a temperature of 110° C. to obtain a $CeO_2/C$ support.

Comparative Preparation Example 2: Preparation of Support 1 g of Ketjen Black as a carbonaceous material was dispersed in distilled water to prepare a carbonaceous material mixture. As a manganese precursor, 6.3 g of a 4 wt % $KMnO_4$ solution and 0.308 g of $Mn(NO_3)_2 \cdot 6H_2O$ were dissolved in 200 g of distilled water to prepare a manganese precursor mixture.

After mixing the carbonaceous material mixture and the manganese precursor mixture, the pH of the mixture was adjusted to about 10 by adding a 2M potassium hydroxide solution.

The pH adjusted mixture was aged at a temperature of 80° C., filtered, and rinsed. Then, the rinsed mixture was dried at a temperature of 110° C. to obtain a $Mn_3O_4$/C support.

Comparative Example 1: Preparation of Catalyst 0.437 g of palladium nitrate ($Pd(NO_3)_2 \cdot 2H_2O$) as a Pd precursor and 0.766 g of hexachloroiridic acid hexahydrate as an Ir precursor were dissolved in distilled water to prepare a mixture. 1 g of Ketjen Black was added to the mixture, and the solvent was evaporated at a temperature of 60° C. under vacuum conditions.

The evaporated product was thermally treated at a temperature of 500° C. in a hydrogen atmosphere, and a PdIr/C catalyst including the second metal PdIr and carbon is manufactured.

Manufacturing Example 1: Manufacture of Electrode

A rotating disk electrode (RDE) was manufactured as follows.

The catalyst prepared in Example 1 and a Nafion solution (Nafion perfluorinated ion-exchange resin, 5 wt % solution in a mixture of lower aliphatic alcohols and water, available from Aldrich) were mixed and homogenized to prepare a catalyst slurry, which was then coated on glassy carbon to form an electrode in thin film form, thereby completing the manufacture of the RDE.

Comparative Manufacturing Example 1: Manufacture of Electrode

An electrode was manufactured in the same manner as in Manufacturing Example 1, except that the catalyst of Comparative Example 1, instead of the catalyst of Example 1, was used.

Figure 4A:
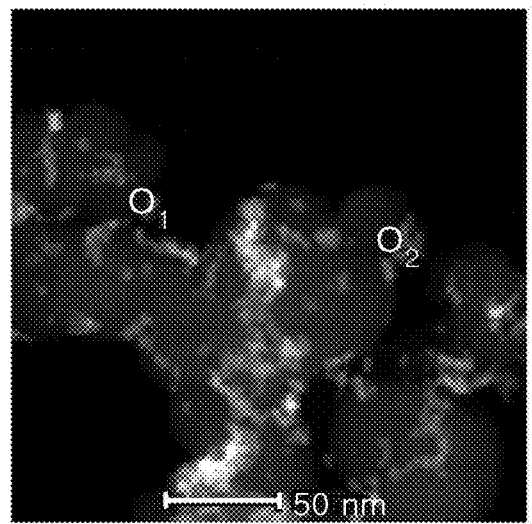
Figure 4B:
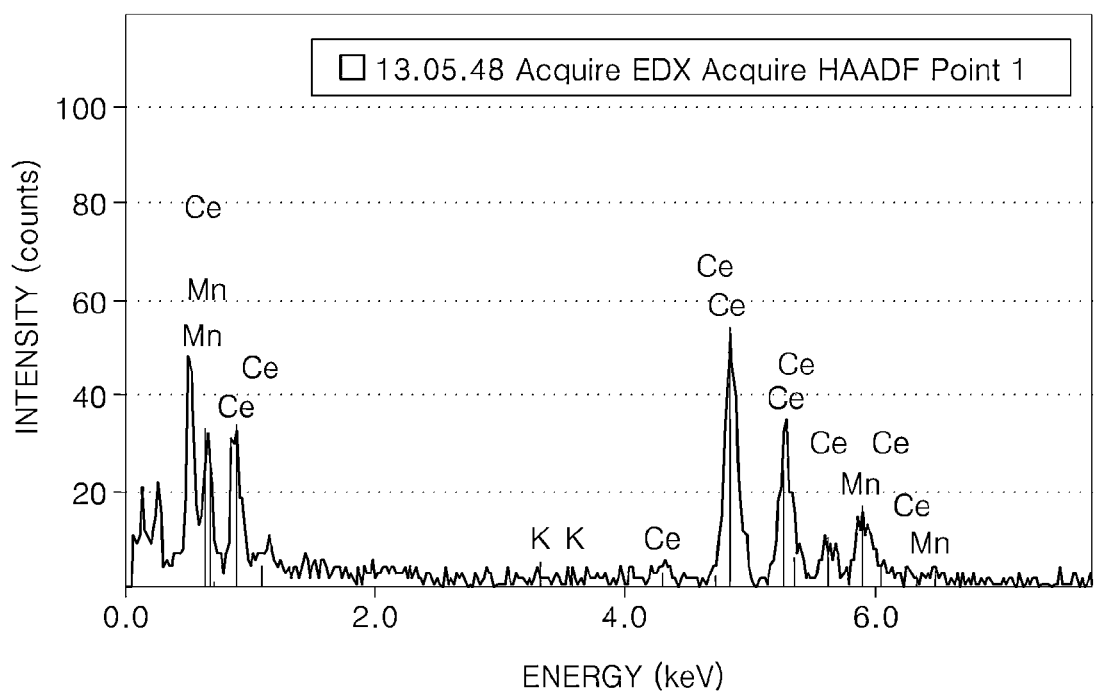
Figure 4C:
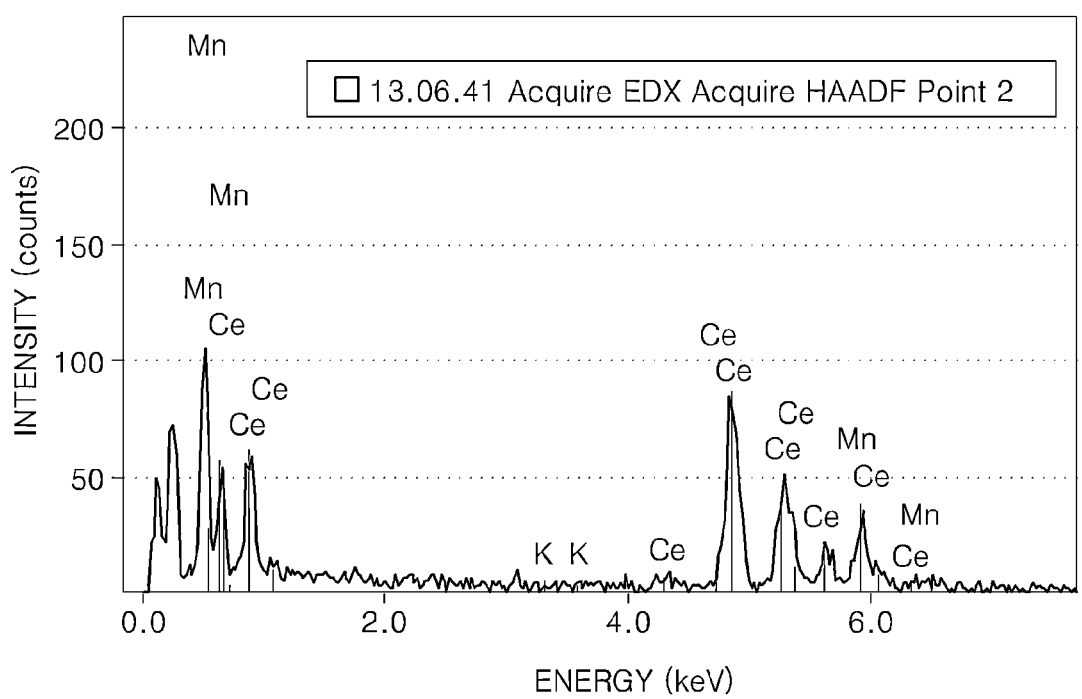

Evaluation Example 1: Energy-Dispersive X-Ray Spectroscopic (EDX) and Transmission Electron Microscopic (TEM) Analysis The catalyst of Example 1 was analyzed by scanning transmission electron microscopy with energy-dispersive X-ray spectrometry (STEM-EDX). Results are shown in FIGS. 4A through 4C. FIGS. 4B and 4C are TEM images of FIG. 4A in $O_1$ and $O_2$ regions.

Referring to FIGS. 4A through 4C, it is confirmed that manganese and cerium are both present in the catalyst.

Evaluation Example 2: X-Ray Diffraction (XRD) Analysis

X-ray diffraction analysis was performed on the composite of Preparation Example 1 and the supports of Comparative Preparation Examples 1 and 2 using an X-ray diffraction analyzer (MP-XRD, Xpert PRO, available from Philips/Power 3 kW using nickel-filtered Cu Ka(I=0.15418 nm) radiation/40 kV and 250 mA). Analysis results are shown in FIG. 5A.

Figure 5A:
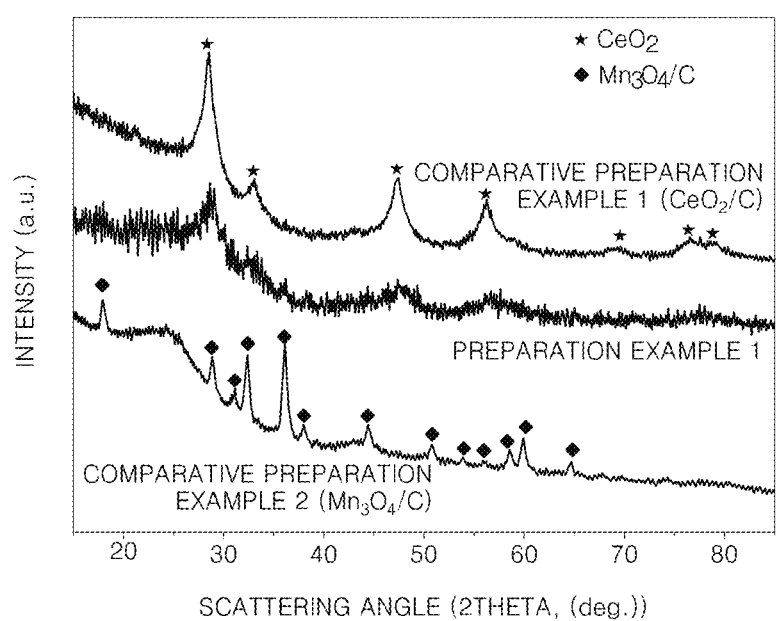
FIG. 5A is a graph of intensity (arbitrary units) versus scattering angle (degrees two-theta, 2θ) and is result of a X-ray diffraction (XRD) analysis of a composite of Preparation Example 1 and supports of Comparative Preparation Examples 1 and 2.

Referring to FIG. 5A, it is confirmed that the composite of Preparation Example 1 is primarily present as particles having the same crystalline structure with the support $CeO_2$/C of Comparative Example 1, and a manganese oxide peak corresponding to a manganese oxide is almost not present. In this regard, it is confirmed that the composite of Preparation Example 1 has a structure in which manganese is dissolved in a unit lattice of a cerium oxide.

Figure 5B:
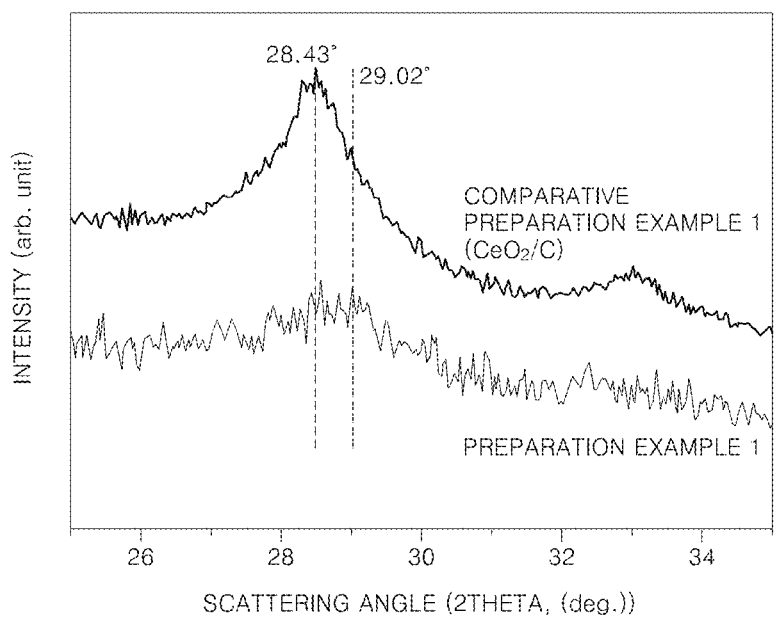
FIG. 5B is a graph of intensity (arbitrary units) versus scattering angle (degrees two-theta, 2θ) and is result of a XRD analysis of a composite of Preparation Example 1 and a support of Comparative Preparation Example 1.
Figure 5C:
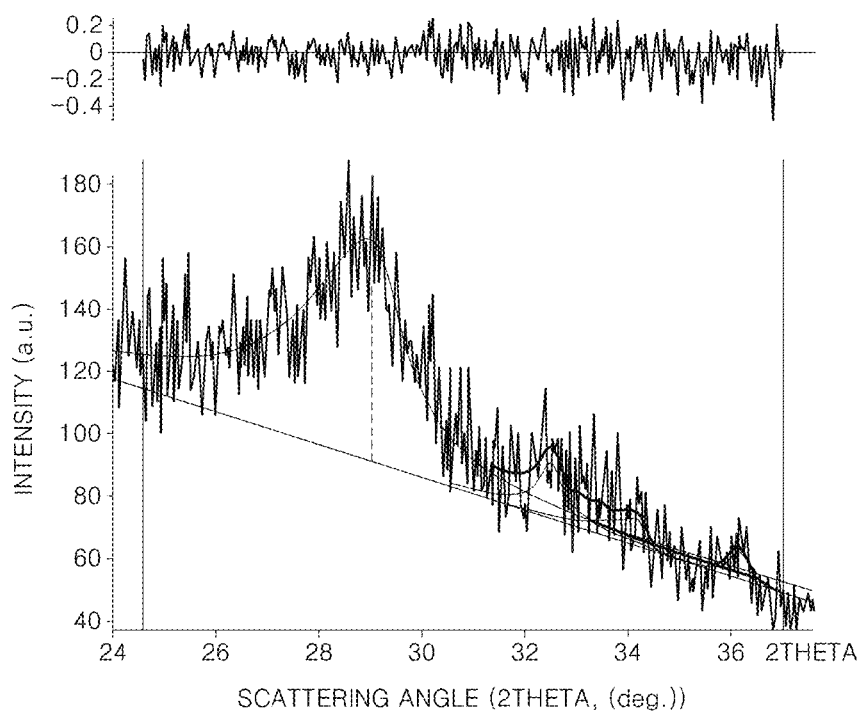
FIG. 5C is a graph of difference versus scattering angle and a graph of intensity (arbitrary units) versus scattering angle (degrees two-theta, 2θ) showing the result of a XRD analysis of a composite of Preparation Example 1.

Also, results of XRD analysis of the composite of Preparation Example 1 and the support of Comparative Preparation Example 1 are shown in FIGS. 5B and 5C. FIG. 5C is a result of processing a peak fitting according to the XRD analysis result of Preparation Example 1, and thus a 111 surface diffraction peak of the oxide of Preparation Example 1 was confirmed at about 29.02° in regard of the fitting result of FIG. 5C.

Referring to FIGS. 5B and 5C, a primary peak diffracted from a 111 surface in the composite of Preparation Example 1 is about 29.02°, which is shifted by a large angle compared to a primary peak of $CeO_2$, which is 28.43°. In this regard, it is confirmed that a distance between 111 surfaces is shortened, and the composite has a structure in which manganese substitutes cerium sites in the cerium oxide crystal.

Evaluation Example 3: Inductively Coupled Plasma (ICP) Analysis

Inductively coupled plasma (ICP) analysis (ICP-AES, ICPS-8100, available from SHIMADZU/RF source 27.12 MHz/sample uptake rate 0.8 ml/min) was performed in order to analyze compositions of the composite of Preparation Example 1, the supports of Comparative Preparation Examples 1 and 2, the catalysts of Example 1 and Comparative Example 1, and analysis results are shown in Table 1 (an amount of metal is shown based on 100 weight % of a total weight of the catalyst).

TABLE 1

| | | Concentration of Metal (weight %) | | | |
|---|---|---|---|---|---|
| | Catalyst | Pd | Ir | Mn | Ce |
| Preparation Example 1 | $Ce_yMn_{1-y}O_2(0.01 \leq y \leq 0.99)$/C | — | — | 4.7 | 12.5 |
| Comparative Preparation Example 1 | $CeO_2$/C | — | — | — | 14.8 |
| Comparative Preparation Example 2 | $Mn_3O_4$/C | — | — | 5.35 | — |
| Example 1 | $PdIr/Ce_yMn_{1-y}O_2(0.01 \leq y \leq 0.99)$/C | 14.96 | 27.76 | 2.47 | 6.2 |
| Comparative Example 1 | PdIr/C | 15.7 | 29 | — | — |

Evaluation Example 4: Oxygen Reduction Reaction (ORR) Performance Analysis of Half Cells 1) Half Cells Including Electrodes of Manufacturing Example 1 and Comparative Manufacturing Example 1

Rotating disk electrodes (RDEs) manufactured in Manufacturing Example 1 and Comparative Manufacturing Example 1 were used as working electrodes.

Electrochemical evaluation was performed using a three-electrode cell. Each half cell was manufactured using an oxygen-saturated 0.1 M-$HClO_4$ solution as an electrolyte, and a Pt foil and a Ag/AgCl electrode were used respectively as a counter electrode and a reference electrode. All the electrochemical experiments were performed at room temperature.

In a 0.1M HClO$_4$ electrolyte solution saturated with oxygen, while rotating the RDE of each of the three-electrode cells at 900 rpm with voltage changes at a scan rate of 5 mV/s, a current were measured at a voltage range from an onset potential (OCV) to about 0.3 V as the ORR activity at room temperature. Measurement results are shown in FIG. 6.

An onset potential refers to a voltage level at which current starts to flow due to an ORR. ORR activity of a catalyst is compared by determining a difference between an onset potential and ORR mass activity of a potential nearest to the onset potential. Also, in FIG. 6, RHE refers to reversible hydrogen electrode.

Figure 6:
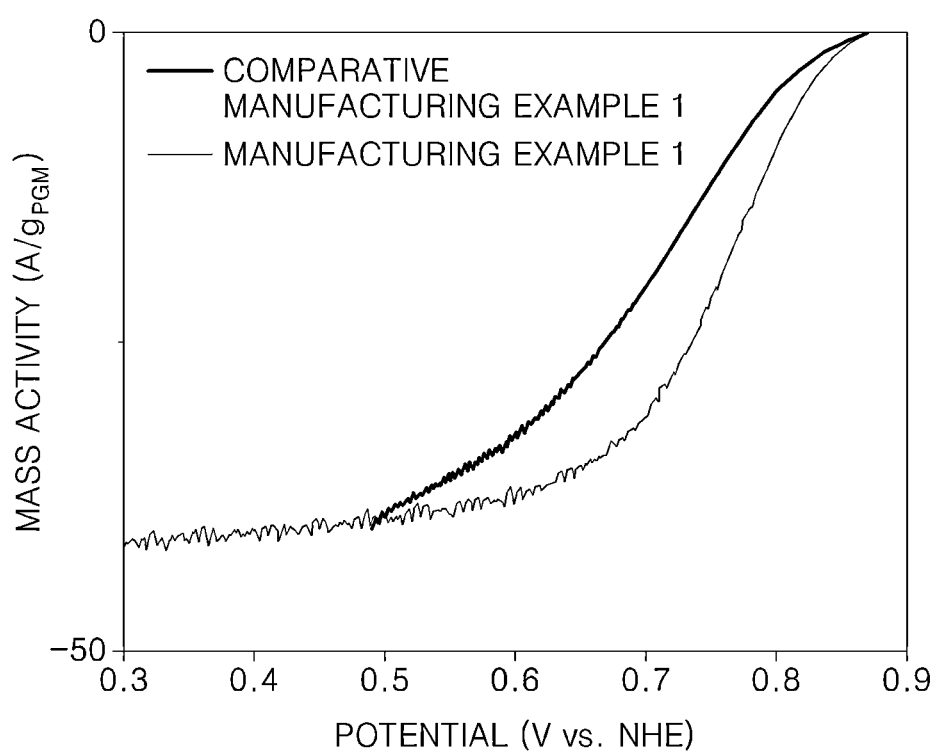
FIG. 6 is a graph of mass activity (amperes per gram, $A/g_{PGM}$) versus potential (volts versus normal hydrogen electrode, NHE) which illustrates an oxygen reduction reaction (ORR) activity at room temperature of half cells including electrodes of Manufacturing Example 1 and Comparative Preparation Example 1.

Referring to FIG. 6, the fuel cell of Manufacturing Example 1 was found to have improved ORR activity compared with the fuel cell of Comparative Manufacturing Example 1.

Evaluation Example 5: Evaluation of Unit Cell Performance

Fuel cells were manufactured using the catalysts of Example 1 and Comparative Example 1 as follows.

To manufacture an anode, 0.03 g of polyvinylidene fluoride (PVDF) and n-methyl-2-pyrrolidone (NMP) were mixed per 1 g of PdIr, thereby preparing an anode-forming slurry. The anode-forming slurry was coated on a microporous layer-coated carbon paper by using a bar coater, and the product was dried while the temperature was gradually increased from room temperature to 150° C., thereby producing an anode. The amount of the catalyst loaded in the anode was 1 mg/cm$^2$.

A cathode was manufactured using the catalyst of Example 1 in the same manner as in the manufacture of the anode described above.

A fuel cell was manufactured by using poly(2,5-benzimidazole) doped with 85 wt % phosphoric acid as an electrolyte membrane between the anode and the cathode.

Cell voltages with respect to current density were measured using the fuel cells including the catalysts of Example 1 and Comparative Example 1. The results are shown in FIG. 7.

Figure 7:
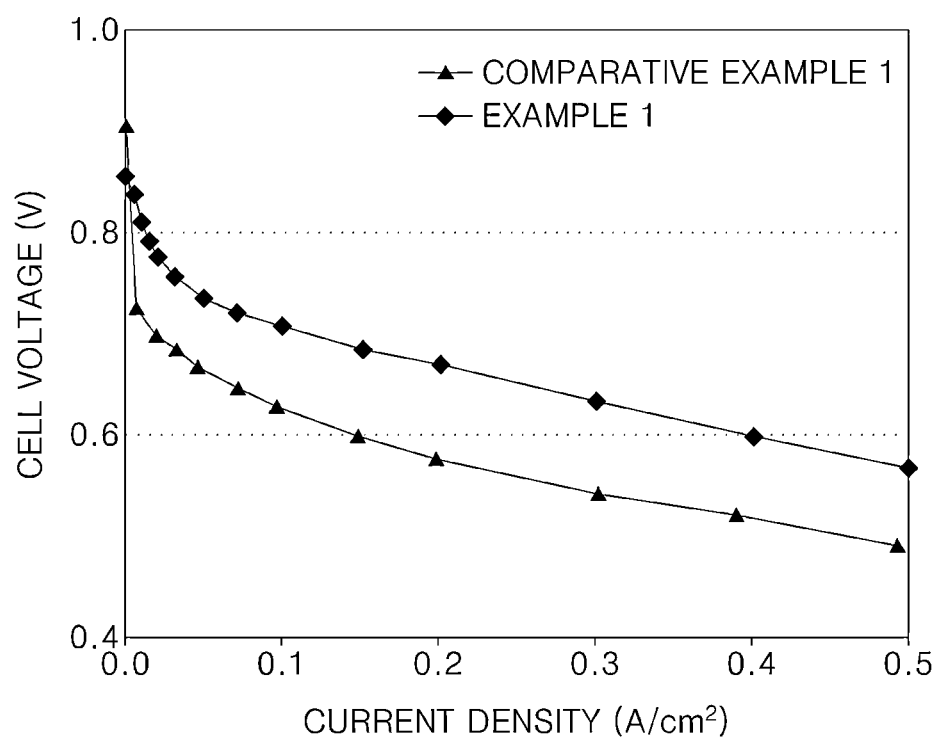
FIG. 7 is a graph of cell voltage (volts, V) versus current density (amperes per square centimeter, A/cm$^2$) which illustrates voltage change with respect to current density in fuel cells including the catalysts of Example 1 and Comparative Example 1.

Referring to FIG. 7, the fuel cell using the catalyst of Example 1 is found to have improved cell performance compared to the fuel cell using the catalyst of Comparative Example 1.

As described above, according to the disclosed embodiment, a composite is a support which has improved oxygen donating activity. When such a composite is used, catalyst activity is improved. A fuel cell including the catalyst using the composite has improved oxygen reduction reaction activity.

It should be understood that the exemplary embodiments described herein should be considered in a descriptive sense only and not for purposes of limitation. Descriptions of features, advantages, or aspects within each embodiment should be considered as available for other similar features, advantages, or aspects in other embodiments.

What is claimed is:

1. A composite comprising:
   carbonaceous material; and
   a particle comprising a solid solution comprising a first metal and a cerium oxide, wherein the solid solution is disposed on the carbonaceous material, and the particle comprising the solid solution has a particle diameter of about 1 nm to about 20 nm, wherein the first metal is at least one selected from manganese (Mn), vanadium (V), copper (Cu), zinc (Zn), iron (Fe), cobalt (Co), and titanium (Ti).

2. The composite of claim 1, wherein the first metal is manganese.

3. The composite of claim 1, wherein the solid solution is present in an amount of about 5 to about 90 parts by weight, based on 100 parts by weight of the composite.

4. The composite of claim 1, wherein an amount of the first metal is about 0.1 to about 1.5 moles, based on 1 mole of cerium of the cerium oxide.

5. The composite of claim 1, wherein the composite comprises a composition represented by at least one selected from Formula 1 and Formula 2:

$$M^1O_x\text{---}CeO_2/C \qquad \text{Formula 1}$$

wherein in Formula 1, 1≤x≤3, M$^1$ is the first metal, and

$$Ce_yM^1_{1-y}O_2/C \qquad \text{Formula 2}$$

wherein in Formula 2, 0.01≤y≤0.99, M$^1$ is the first metal, and in Formulas 1 and 2, independently, the first metal is at least one metal selected from Groups 3-8, 10-14, and 16.

6. The composite of claim 5, wherein the first metal is manganese.

7. A catalyst comprising the composite of claim 1 and a second metal.

8. The catalyst of claim 7, wherein the second metal is at least one metal selected from Groups 8-11.

9. The catalyst of claim 8, wherein the second metal is at least one selected from platinum (Pt), palladium (Pd), ruthenium (Ru), iridium (Ir), gold (Au), and silver (Ag).

10. The catalyst of claim 9, wherein the second metal is an alloy comprising Pd and Ir.

11. The catalyst of claim 7, wherein the second metal is present in an amount of about 1 to about 70 parts by weight, based on 100 parts by weight of the catalyst.

12. The catalyst of claim 7, wherein the first metal of the composite is manganese, and the second metal is an alloy of palladium and iridium.

13. The catalyst of claim 7, wherein the catalyst comprises an active particle comprising the composite of claim 1 and the second metal, and the active particle is disposed on the carbonaceous material.

14. A fuel cell comprising:
   a cathode;
   an anode; and
   an electrolyte membrane disposed between the cathode and the anode,
   wherein at least one of the cathode and the anode comprises a catalyst comprising the composite of claim 1.

15. The fuel cell of claim 14, wherein the composite further comprises a second metal, wherein the second metal is at least one selected from platinum (Pt), palladium (Pd), ruthenium (Ru), iridium (Ir), gold (Au), and silver (Ag).

16. A lithium air battery comprising an electrode comprising the composite of claim 1.

17. A method of manufacturing the composite of claim 1, the method comprising;
   combining a first metal and a cerium oxide to form a solid solution; and
   disposing the solid solution on the carbonaceous material to manufacture the composite.

18. A method of manufacturing the catalyst of claim 10, the method comprising:
- providing a first metal-cerium oxide solid solution;
- contacting a second metal or a precursor of the second metal with the first metal-cerium oxide solid solution; and
- heating the solid solution and the second metal to form the catalyst.

19. A catalyst comprising a composite and a second metal, the composite comprising:
- carbonaceous material; and
- a particle comprising a solid solution comprising a first metal and a cerium oxide, wherein the solid solution is disposed on the carbonaceous material, and the particle comprising the solid solution has a particle diameter of about 1 nm to about 20 nm,
- wherein the catalyst comprises an active particle comprising the composite and the second metal, and the active particle is disposed on the carbonaceous material, wherein the active particle comprises:
- a core comprising the particle comprising the solid solution; and
- a shell comprising a reduction product of the first metal-cerium oxide and the second metal, the shell being a product of treating the solid solution and the second metal in a high temperature reduction process.

* * * * *